United States Patent
Cunningham et al.

(10) Patent No.: US 7,431,684 B2
(45) Date of Patent: Oct. 7, 2008

(54) CENTRIFUGE COMPRISING HYDRAULIC DIFFERENTIAL SPEED DETERMINATION

(75) Inventors: Sinclair Upton Cunningham, Kirkcaldy (GB); Peter Forster, Zürich (CH)

(73) Assignee: Viscotherm AG, Hinteregg-Zurich (CH)

( * ) Notice: Subject to any disclaimer, the term of this patent is extended or adjusted under 35 U.S.C. 154(b) by 124 days.

(21) Appl. No.: 10/553,867

(22) PCT Filed: Apr. 22, 2003

(86) PCT No.: PCT/EP03/04147

§ 371 (c)(1),
(2), (4) Date: Jul. 20, 2006

(87) PCT Pub. No.: WO2004/094066

PCT Pub. Date: Nov. 4, 2004

(65) Prior Publication Data

US 2007/0203009 A1  Aug. 30, 2007

(51) Int. Cl.
*B04B 1/20* (2006.01)
*B04B 9/06* (2006.01)
*B04B 9/10* (2006.01)

(52) U.S. Cl. ................... 494/7; 494/53; 494/84

(58) Field of Classification Search ............. 494/7–9, 494/53, 84; 210/380.1, 380.3
See application file for complete search history.

(56) References Cited

U.S. PATENT DOCUMENTS

| | | | | |
|---|---|---|---|---|
| 3,923,241 A | * | 12/1975 | Cyphelly | 494/53 |
| 4,073,431 A | * | 2/1978 | Jager | 494/9 |
| 4,085,888 A | * | 4/1978 | Jager | 494/9 |
| 4,113,171 A | * | 9/1978 | Cyphelly | 494/53 |
| 4,228,949 A | * | 10/1980 | Jackson | 494/2 |
| 4,240,578 A | * | 12/1980 | Jackson | 494/8 |
| 4,298,162 A | * | 11/1981 | Hohne | 494/53 |
| 4,369,915 A | * | 1/1983 | Oberg et al. | 494/8 |
| 4,411,646 A | * | 10/1983 | Cyphelly | 494/53 |
| 4,581,896 A | | 4/1986 | Andresen et al. | |
| 4,668,213 A | * | 5/1987 | Kramer | 494/8 |
| 5,037,372 A | * | 8/1991 | Weder | 494/53 |
| 2004/0138040 A1 | * | 7/2004 | Hensley et al. | 494/53 |

FOREIGN PATENT DOCUMENTS

| | | | |
|---|---|---|---|
| DE | 2525280 | | 12/1976 |
| DE | 3409112 A1 | * | 9/1985 |
| DE | 4028441 A1 | * | 3/1992 |
| DE | 4041923 A1 | * | 7/1992 |
| FR | 542659 | | 8/1922 |
| FR | 6942189 | | 9/1971 |
| JP | 04290562 A | * | 10/1992 |
| WO | 8401804 | | 5/1984 |

* cited by examiner

*Primary Examiner*—Charles E Cooley
(74) *Attorney, Agent, or Firm*—Novak Druce & Quigg, LLP

(57) ABSTRACT

Disclosed is a centrifuge including a rotationally mounted drum and a worm mounted therein in a concentric manner to rotate at a different speed therefrom. The drum and the worm are driven by a stationary motor unit. A hydraulic motor, provided with a housing and a rotor and fed by means of a hydraulic pump, is mounted therebetween. Such a centrifuge has the hydraulic feed pump assigned to the hydraulic motor to rotate along with the hydraulic motor while the rotor thereof is supported outside the rotating centrifuge parts to not rotate together with the rotating centrifuge parts. Additionally, the quantity of liquid delivered to the hydraulic motor by the feed pump is modified via displacement members actuated in a hydraulic fashion and disposed on the drive unit to rotate therewith.

11 Claims, 6 Drawing Sheets

US 7,431,684 B2

CENTRIFUGE COMPRISING HYDRAULIC DIFFERENTIAL SPEED DETERMINATION

This application is a §371 National Stage Application of International Application No. PCT/EP 2003/004147, filed on Apr. 22, 2003.

BACKGROUND OF THE INVENTION

The invention relates to a centrifuge comprising a rotatingly mounted bowl and, concentrically rotatingly mounted therein, a scroll rotating at a differential speed which are powered by a central exterior (stationary located) motor assembly and interposed therebetween—where provided as the gearbox controllably defining said differential speed—a hydraulic motor with its casing, on the one hand and its rotor, on the other, the feed of which is provided by a hydraulic pump.

Centrifuges of the aforementioned kind are such in which a gearbox is interposed between two parts rotating at different speeds, the two parts being termed bowl and scroll, i.e. as in decanting centrifuges as mainly intended herein. Involved in particular are solid bowl scroll centrifuges, also screen bowl and full pool decanters. Likewise involved are the number and nature of the phases of the infed solids/liquid mixture, also termed suspension, separated from each other by the centrifugal force. These centrifuges can be provided for two-phase solids/liquid separation, but also for multi-phase separation involving multiple liquid or solids phases. Separation occurs because of the difference in the specific weight of the phases to be separated by centrifugal force. Centrifuges of this kind belong to prior art in a broad spectrum.

It is basically possible to power the two parts of the centrifuge revolving at different speeds by separate stationary motor assemblies (drive motor plus gearbox). But it is regularly the case that only one stationary drive motor assembly is provided for powering one of the two parts, preferably the bowl, from the powered motion of which the rotary motion of the other part is derived by a gearbox defining the differential speed between the two parts. In this arrangement it is important that the torque to be communicated between the two parts is particularly high as a rule. The interposed gearbox needs to be suitable for handling these high torques. Hitherto for these interposed gearboxes, for example, high performance epycycloidal gearboxes were provided which work however with a fixed translation ratio, with the result that one could not take into account differential speed changes that would be needed for many regulation requirements and for adaptions to the corresponding suspension to be processed. Another possibility of achieving such an interposed gearbox is a hydraulic motor which is simple to control because of the simplicity in dimensioning the flow of the hydraulic fluid as regards its speed. Such a controlled variable difference in speed is particularly of advantage, because depending on the particular suspension to be processed separation can be optimized simply by trial and error. In this respect it needs to be taken into account that the flow of suspension per unit of time and particularly its consistency is not uniform, requiring a combination of open and closed loop control. This may result in, for example, an added risk of the machine becoming plugged by accumulations in the solids phase materializing from the suspension parameters not being constant, etc. Such accumulation are indicated by an increase in the torque of the scroll, whereupon one can, by increasing the differential speed, achieve an increase in the solids outfeed in thus counteracting the risk of plugging. Also particularly problematic is that when the central exterior motor drive assembly is down, the stationary bowl can no longer be freed of the solids having sedimented there. Examples of such a centrifuge whose interposed gearbox is achieved by a variable speed, high torque, slow-running, corotating hydraulic motor read from the patents FR 542 659, FR 69 42 189 and U.S. Pat. No. 3,923,241. Necessary for feeding such hydraulic motors interposed between bowl and scroll is a pump assembly arranged exterior and stationary as evident from prior art as cited above, because the flow of hydraulic fluid feeding the hydraulic motor needs to be communicated from a stationary feed circuit into the rotating centrifuge system. This is achieved—for instance, analogously to an electric motor by slip ring/brush—by means of a so-called rotary feedthrough. Because of the substantial hydraulic fluid feed flow at high pressure deriving from a high displacement volume the rotary feedthrough is subject to high demands both as regards flow and as regards pressure so that the size and particularly also the leakage problems involved in this problematic component make for major difficulties. Thus, although such a corotating hydraulic motor combines salient advantages as to lightweight design, good closed loop control or regulation and rugged operation, the rotary feedthrough needed hitherto is a drawback.

BRIEF SUMMARY OF THE INVENTION

The invention is thus based on the object of providing a centrifuge of the aforementioned kind comprising a corotating hydraulic motor as a controllable gearing connection and a feeding hydraulic pump which places far less demands on the rotary feedthrough as to size and complicated configuration in mastering the leakage losses.

This is achieved in accordance with the invention in that at least the hydraulic pump (feed pump) is assigned to the hydraulic motor in a corotating manner for feeding the hydraulic motor, the rotor of the hydraulic pump being supported exterior to the rotating centrifuge parts in a non-corotating manner (supporting lever) and in that the change in the liquid amount or flow supplied by the feed pump to the hydraulic motor is brought about by adjusting members actuated hydraulically and arranged to corotate with the drive.

Relocating the feed pump from its hitherto stationary location into the centrifuge, i.e. into the rotating parts thereof to thus corotate with the hydraulic motor, on the one hand, and the change in the flow supplied from the feed pump to the hydraulic motor via corotating adjusting members for open/closed loop control, on the other, results in the so-called rotary feedthrough being transposed into the low-pressure area in thus being required to communicate substantially less hydraulic fluid flow than hitherto. This now makes it possible to configure the rotary feedthrough not only simpler and smaller but also to reduce the leakage losses in this area. However, a rotary feedthrough even in this substantially less complicated configuration is still necessary because the feed circuit between hydraulic pump and hydraulic motor is unstable. Leakage losses in the hydraulic motor and hydraulic pump are unavoidable; the hydraulic fluid itself remains inconstant due to temperature effects and loads, and it needs conditioning. For this purpose, a part of the hydraulic fluid flow is branched off and conditioned via a scavenging circuit.

The hydraulic pump (feed pump) for the hydraulic motor is accommodated preferably together with the latter in a common casing, the support of the pump rotor being guided to the exterior and is preferably made stationary.

In a further preferred embodiment comprising a feed pump having a constant displacement volume, the adjustment member is a flow control valve which returns the amount of feed liquid not required by the hydraulic motor to the non-pressurized area of the flow or liquid circuit, this flow controller setting either the flow liquid amount branched off from the working circuit (2-way flow control) or directly regulating the flow liquid amount delivered to the hydraulic motor (3-way flow control).

In a further preferred aspect the control aperture through which the regulated flow of hydraulic fluid flows is controlled by application of the return pressure or with a proportional solenoid.

With a rotary feed pump having a variable displacement volume it is preferably provided for that the adjusting member is a valve (servo member)-activated hydraulically actuated cylinder or actuator.

In another embodiment the servo member is directly activated via a proportional solenoid.

In yet another embodiment or modification of activation the servo member is actuated directly or indirectly via the charging pressure of a charging pump.

The elements (cooling and/or filter means) of the scavenging circuit serving to condition the drive fluid are preferably arranged exterior to the rotating system. However, they could also be incorporated in the rotating part.

Further, in yet a further preferred embodiment the charging pump, like the feed pump, is arranged corotating with the hydraulic motor.

Apart from setting a specified difference in speed between that of the bowl and that of the scroll as a function of the suspension to be processed or of the intended result of separation, considerations may also be needed in closed loop control (regulation) for stabilizing a specific mode of operation, especially with fluctuating suspension consistency, irregular solids feed and the like, all of which changes the torque requirement on the scroll. To detect such torque relationships it is provided for in still another preferred embodiment to sense the supporting force of the pump rotor(s) exterior to the rotating parts of the centrifuge in making use of corresponding closed and open loop control variables.

The invention achieves a series of remarkable advantages:
no separate pump assembly needed
only a single electric motor needed
machine absorbs less motor power; on scroll overload and product feed OFF the electric motor is able to furnish more power for driving the scroll
operation of the scroll drive ensured up to bowl standstill on power outage
lightweight, compact configuration
improved overall efficiency due to shorter conduit system with no bottlenecks and due to elimination of flow losses in rotary feedthrough.

This energy saving aspect is in particularly strong contrast to such systems as involved in patents FR 69 42 189 and U.S. Pat. No. 3,923,241.

BRIEF DESCRIPTION OF THE DRAWINGS

The invention will now be detained with reference to the attached FIGs. in which:

FIG. 13 is an embodiment from the above series of examples in which the servo member is directly actuated via a proportional magnet;

FIGS. 12, 14 and 15 are examples in the above series in which the servo member is activated directly or indirectly via the charging pressure of a charging pump;

FIG. 16 is a circuit showing the arrangement of the elements for conditioning the drive fluid exterior to the rotating system as well as the arrangement of the charging pump corotating with the hydraulic motor of the feed pump and the open/closed loop control elements for the feed in the series of the above examplary embodiments.

DETAILED DESCRIPTION OF THE INVENTION

Figure 1:
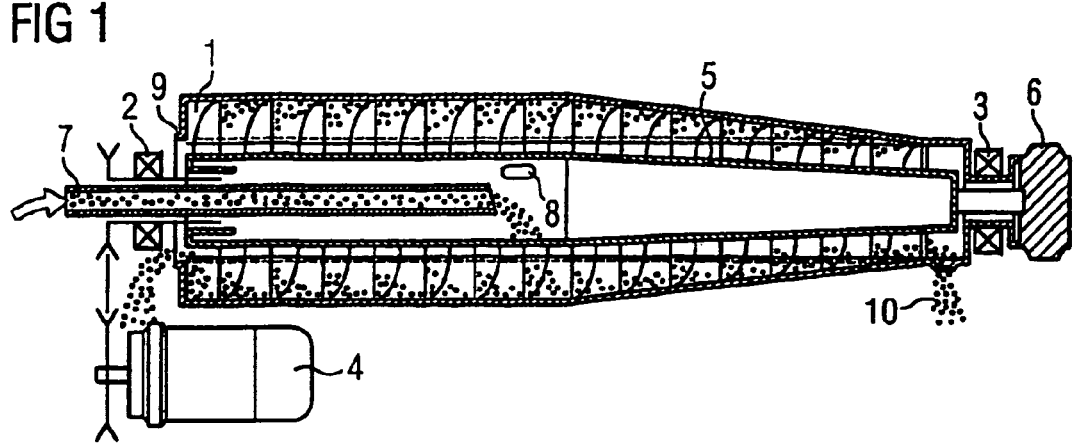
FIG. 1 is a basic illustration of a solid bowl scroll-type centrifuge.

Referring now to FIG. 1 there is illustrated how such a machine mainly comprises a bowl 1 rotating on bearings 2 and 3 and powered by the motor 4; coaxially located in the bowl is a scroll 5 which by means of the scroll drive 6 runs at a speed slightly different to that of the bowl, resulting in the scroll rotating at a differential speed relative to the bowl. Via the feed tube 7 the product or solids/liquid mixture is fed into the hub of the scroll which gains access via ports 8 to the separator space where it forms a ring pool, the level of which is restricted by the overflow weirs 9. The heavier phase (sediment) is deposited on the wall of the bowl and is conveyed by the scroll via the conus from the pool up to the discharge ports 10 from which it is ejected.

Figure 2:
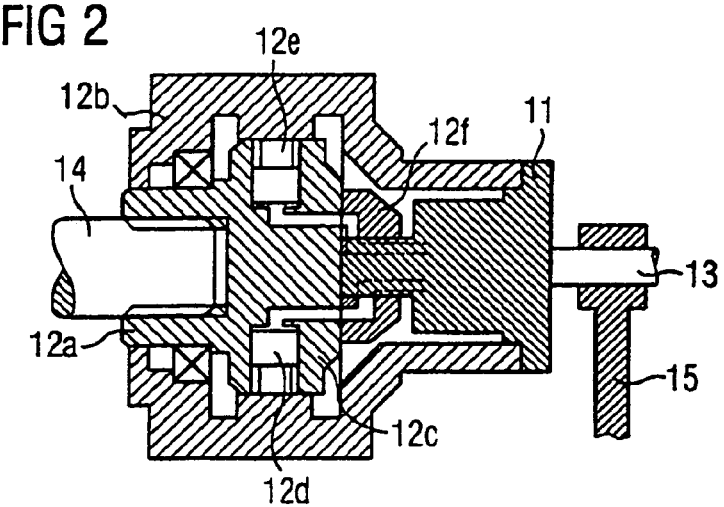
FIG. 2 is a diagrammatic view of a hydraulic motor/feed pump assembly employed in accordance with the invention in the area of the rotating parts of the centrifuge.
Figure 2A:
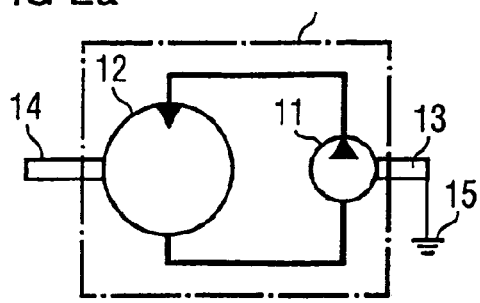
FIG. 2a is a hydraulic circuit diagram of the configuration as shown in FIG. 2.

Referring now to FIG. 2 there is illustrated diagrammatically one such drive. A multistroke radial piston machine is shown as an example for the high-torque hydraulic motor 12. In the casing 12b of the radial piston machine, connected to the bowl, a rotor 12c rotates with the radial arrangement of pistons 12d generating the tangential force via followers (rollers) 12e at the cam plate 12a. The working chambers alternatingly receive hydraulic fluid via the distributor 12f which in turn is fed by the pump 11 whose rotor shaft 13 is secured to the lever arm 15 supporting the torque (stationary) of the rotor shaft 13. The scroll shaft 14 is inserted non-rotatively into the rotor 12c. Thus, what is involved is rotating hydrostatic gearbox in a closed circulating as illustrated rudimentarily by the block circuit diagram. Such a gearbox will only be suitable for continuous operation when continuously a part (15-25%) of the fluid in circulation is drawn off for cooling and filtering (scavenging) before being returned. The scavenging circuit is arranged on the low-pressure side of the system, whereby, depending on the type of pump involved, a minimum bias pressure is often provided so that no cavitation can occur in the suction area of the pump (particularly at high speeds).

Figure 3:
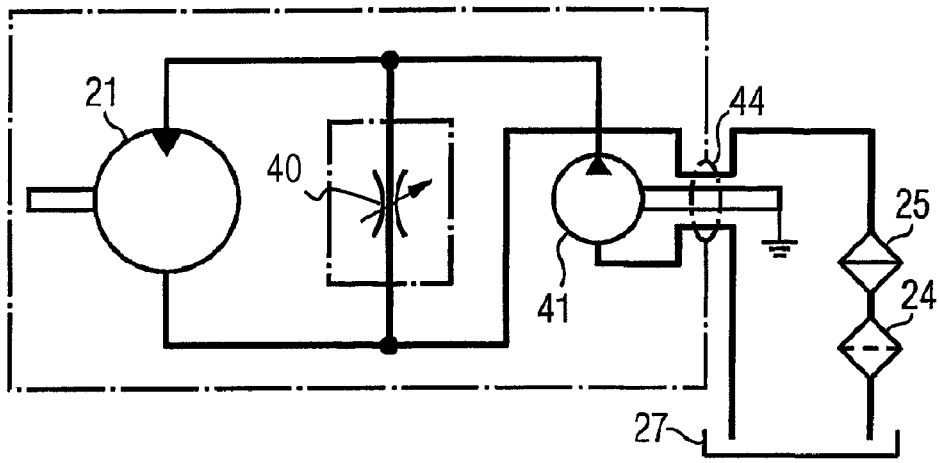
FIG. 3 is a generalized hydraulic circuit diagram of the configuration in accordance with the invention as shown in FIG. 2 showing how open/closed loop control of the flow is achieved by means arranged with the hydraulic motor and feed pump in the rotating part of the machine.

Referring now to FIG. 3 there is illustrated one such drive system including a scavenging oil circuit. The main driving source is the hydraulic motor 21 which powers the rotating system as a whole, including the scroll drive (not shown). At the suction end of the pump 41 the scavenging oil is delivered and directed through the filter 24 around the cooler 25 and then via the biasing valve (not shown) into the tank 27. The scavenging pump 26 (not shown in FIG. 3, but see FIG. 12) suctions fresh conditioned oil from the tank 27 which is fed in the return flow from the hydraulic motor 21. The leakage conduit (not shown, but see FIG. 12 for an example of a leakage conduit) to the tank runs separate from the scavenging circuit.

Referring still to FIG. 3 it is thus illustrated symbolically how not only the feed pump for the hydraulic motor is assigned thereto—preferably in a common casing—for rotation, but also open/closed loop control of the liquid flow delivered by the feed pump to the hydraulic motor so that the hydraulic motor can be operated with adjustable variable speed and thus, by way of example, the decanter can be operated with adjustable variable differential speed between bowl and scroll. This is symbolically expressed in FIG. 3 by the controllable aperture 40 indicated between the hydraulic motor 21 and the corotating feed pump 41. Via the rotary feedthrough 44 the working fluid is basically drawn off from the tank 27 via filter 24, and/or cooler 25 and returned to the tank or vice-versa.

Figure 4:
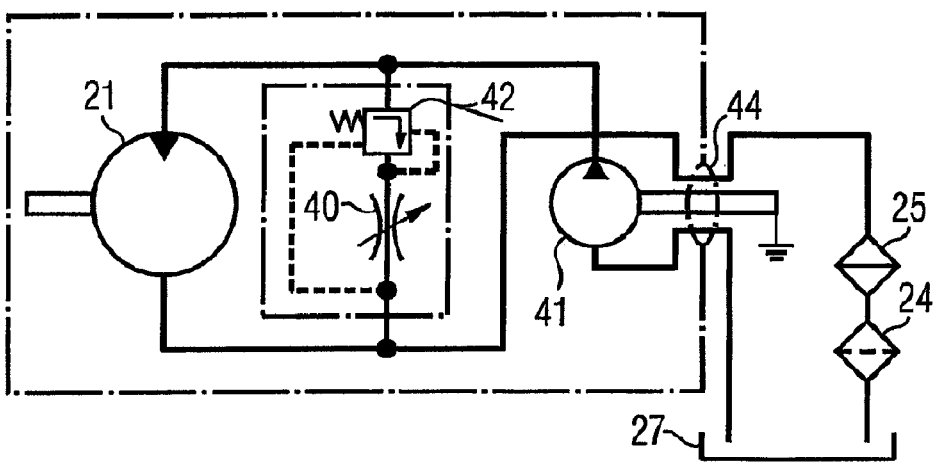
FIGS. 4 and 5 are examples of closed loop control of flow either by discharging the non-required feed liquid of a flow or liquid amount branched off from the feed pump in the non-pressurized portion of the flow circuit or directly by closed loop control of the feed flow delivered by the hydraulic motor.
Figure 5:
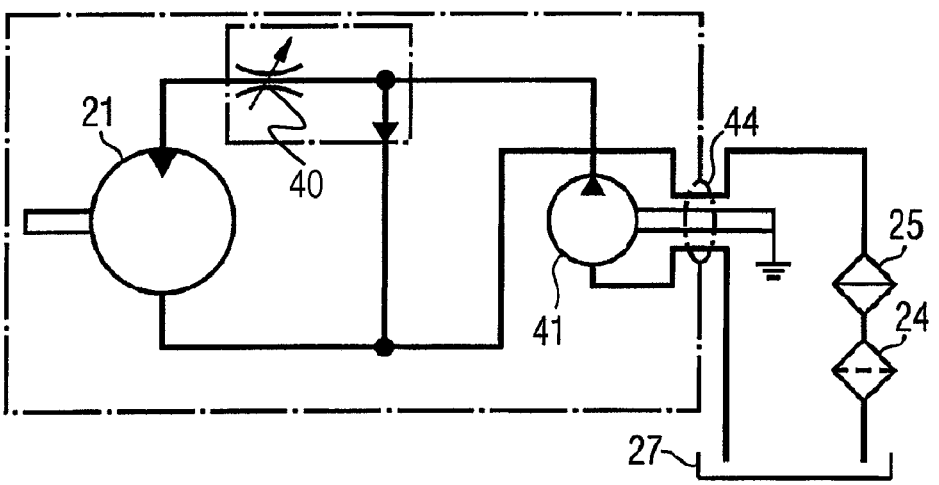

Referring now to FIG. 4 there is illustrated the embodiment in more detail of a controlled flow-control valve 42 in combination with an assigned aperture 40 which branches off the hydraulic fluid not required by the hydraulic motor 21 into the non-pressurized area (2-way flow control) whilst FIG. 5 shows the arrangement of a closed loop controlled aperture 40 in the feed circuit between pump 41 and hydraulic motor 21(3-way flow control).

Figure 6:
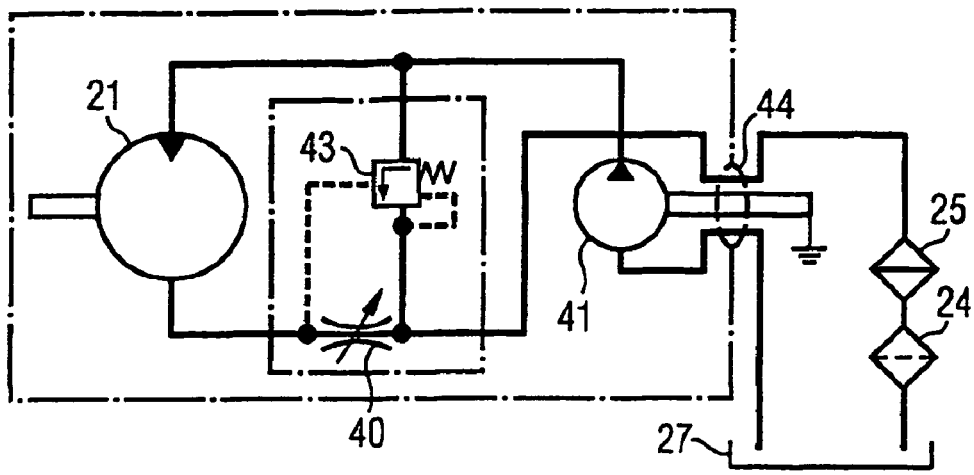
FIGS. 6 to 8 are circuit diagrams showing how a control aperture of the flow controller can be provided on both the rotating system and on the non-rotating system.
Figure 7:
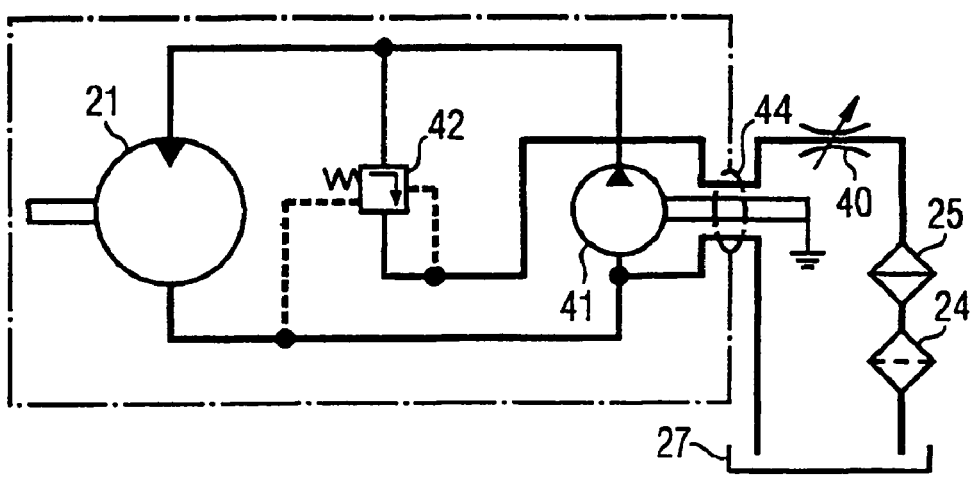
Figure 8:
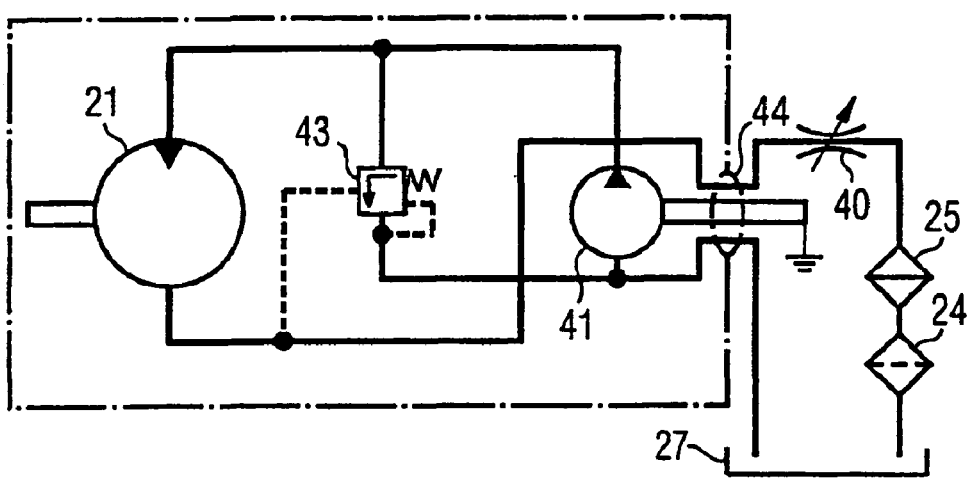

Referring now to FIG. 6 there is illustrated the aperture 40 inserted in the return flow area of the hydraulic motor 21, the flow control valve 43 controlling the working sequence. As evident from FIGS. 7 and 8 as compared to FIG. 6 the aperture 40 of the flow control valve 42 and 43 respectively may also be arranged exterior to the rotating system.

Figure 9:
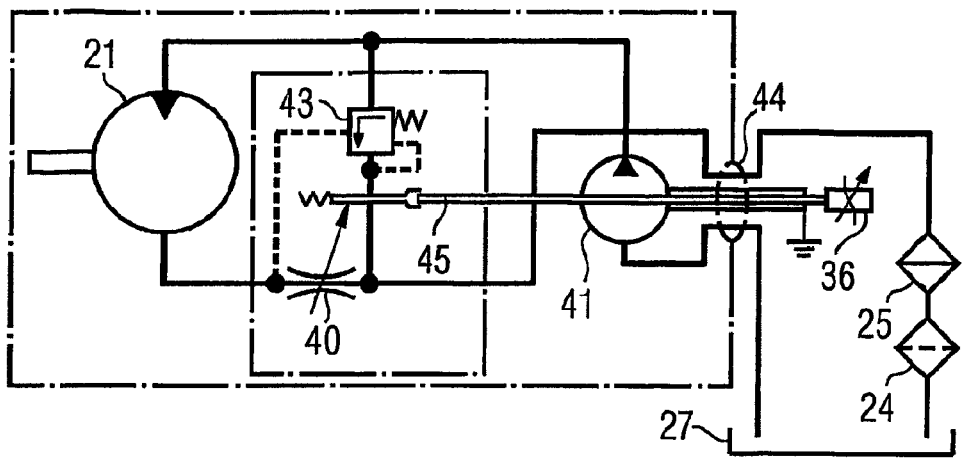
FIGS. 9 and 10 show embodiments in which the control aperture of the flow controller through which the regulated flow flows is activated by the return pressure or with the aid of a proportional magnet.
Figure 10:
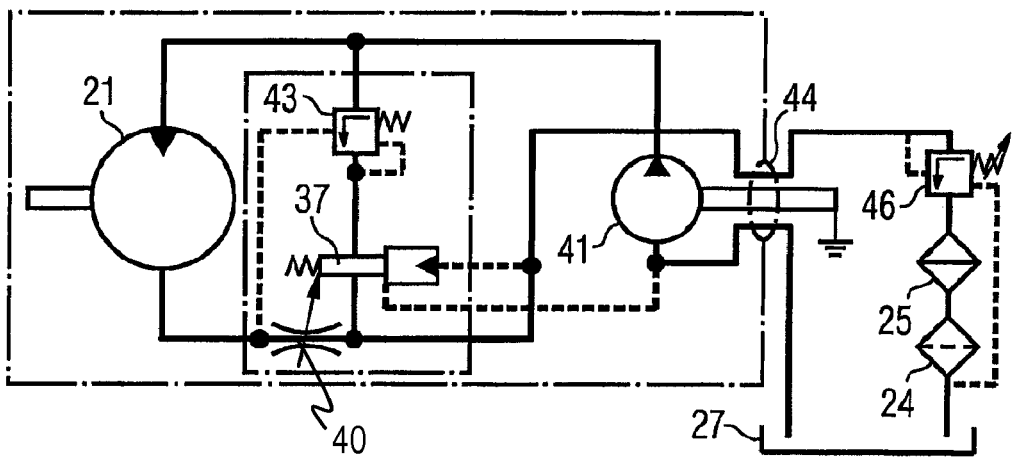
Figure 11:
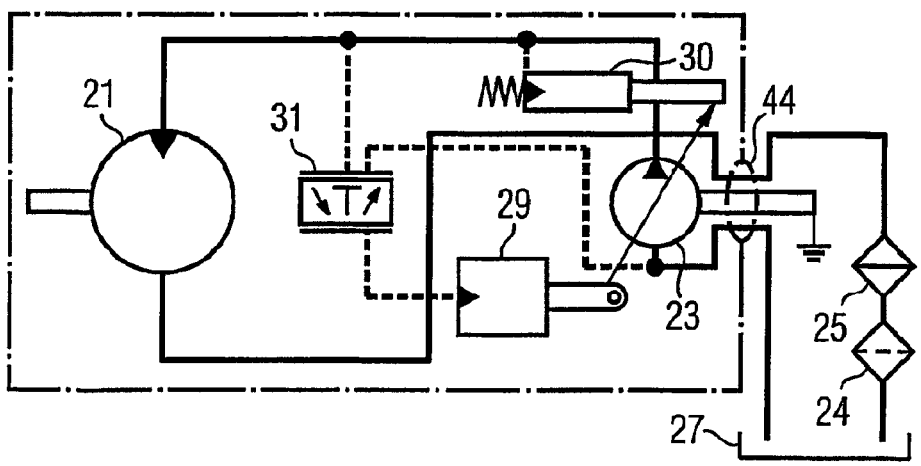
FIGS. 11 to 16 show examplary embodiments in which the adjustment member comprises a valve-activated hydraulically cylinder.

Referring now to FIGS. 9 and 10 there is illustrated how a proportional magnet or solenoid 36 is used to control (via direct actuator 45 in FIG. 9) the corotating valve system 43 with the aperture 40 and respectively how an actuator 37 controls an aperture 40 through which the controlled flow flows, with the aid of the return pressure as dictated by the valve 46 exterior to the rotating system.

It is to be noted that in FIGS. 11-16, examples of embodiments are shown in which the feed pump comprises a variable displacement volume, two opposed cylinders (actuators) 29 and 30 being provided for this purpose. The small caliber cylinder (actuator) 30 receives the operating pressure of the feed pump 23 and is spring-assisted. The larger caliber cylinder (actuator) 29 is activated via a servo slide gate or valve 31, at the right-hand side of which a spring may be active whose compressive force increases to the left with increasing effect of the cylinder (actuator) 29 (travel return). Pressurizing the servo slide valve 31 displaces the cylinder (actuator) 29 until the force at the servo slide valve 31 is equalized (counter-pressure spring FIG. 13). The displacement of the cylinder (actuator) thus corresponds to the pressure applied to the servo slide valve 31.

Figure 12:
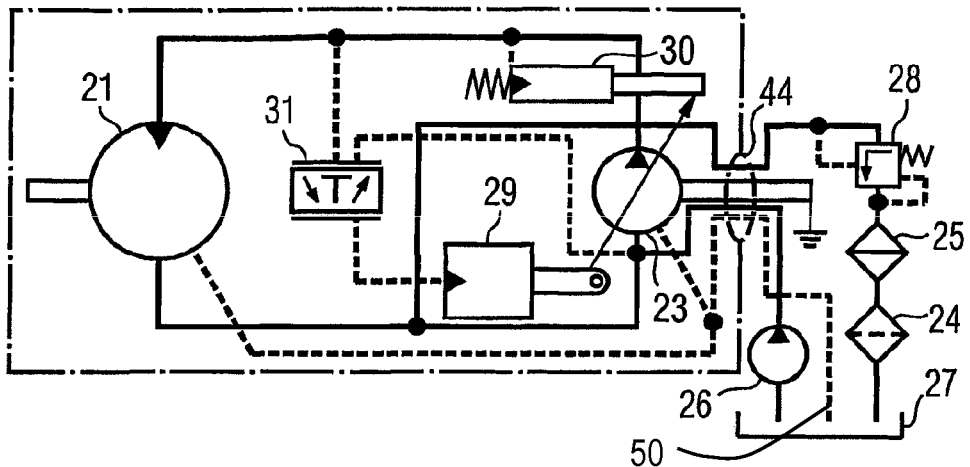
Figure 13:
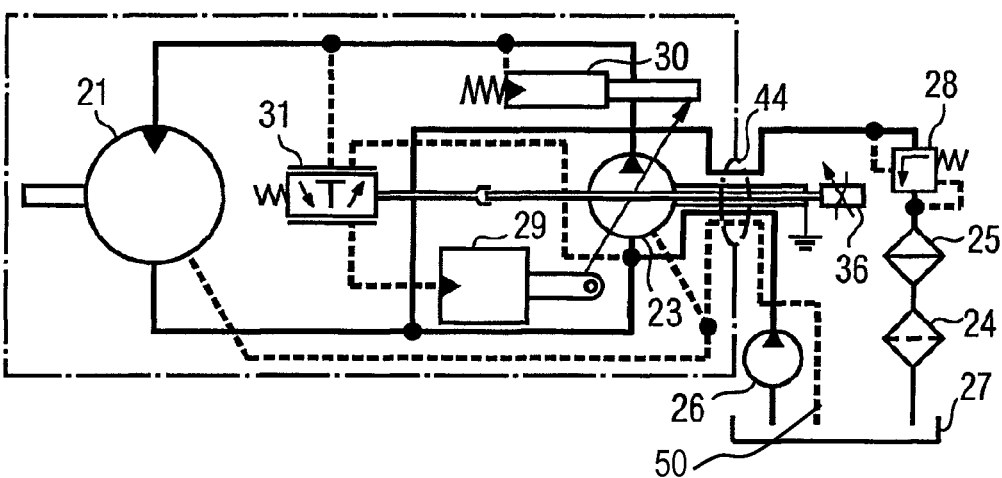
Figure 14:
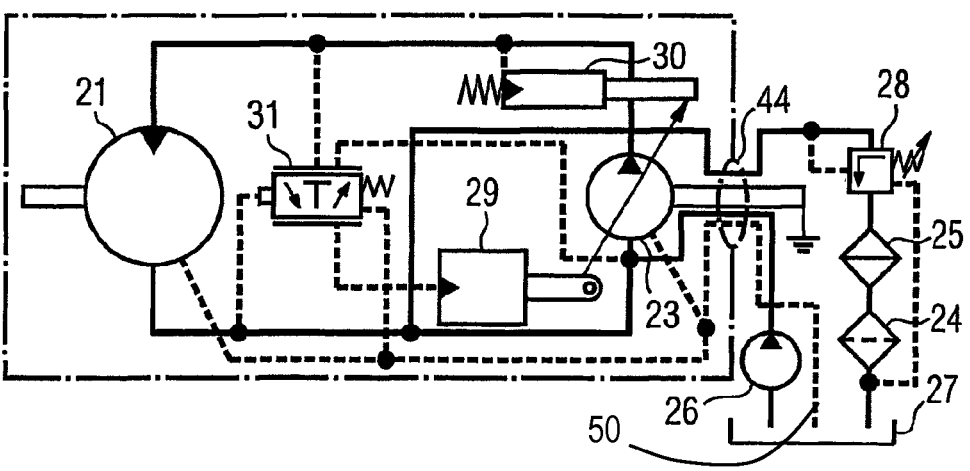
Figure 15:
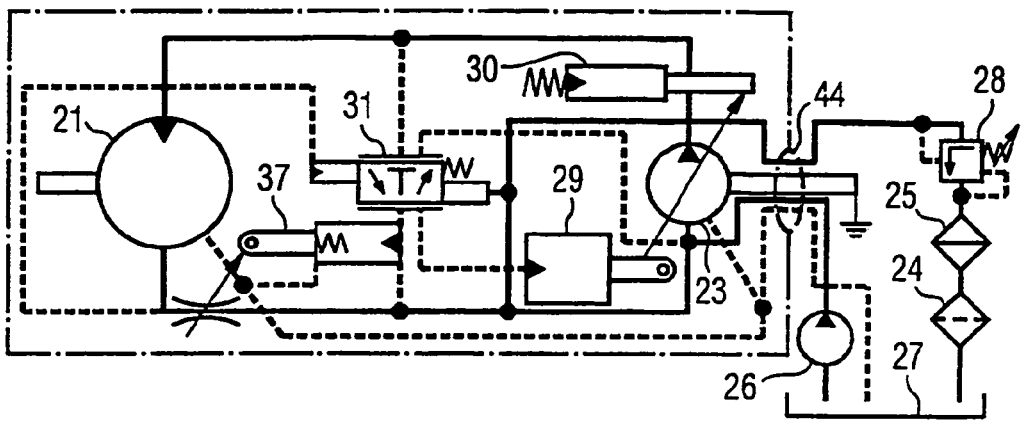

FIGS. 12-14 illustrate various embodiments of the following features: at the suction end of the pump 23 the scavenging oil is delivered and directed through the filter 24 around the cooler 25 and then via the biasing valve 28 into the tank 27. The scavenging pump 26 suctions fresh conditioned oil from the tank 27 which is fed in the return flow from the hydraulic motor 21. The leakage conduit 50 to the tank (broken line) runs separate from the scavenging circuit.

Referring now to FIG. 13 there is illustrated how the servo member 31 may be controlled directly via a proportional magnet or solenoid. However, the servo member 31 may also be activated directly or indirectly via the charging pressure of a charging pump 26 (see valve 28).

Although not shown in the FIGs., the cooling and filtering means 24 and 25 for conditioning the hydraulic fluid can also be arranged within the rotating system. Generally, however, according to the shown example embodiments, such means 24 and 25 are provided like the tank 27 stationary and thus decoupled from the rotating system via the rotary feedthrough 44.

Figure 16:
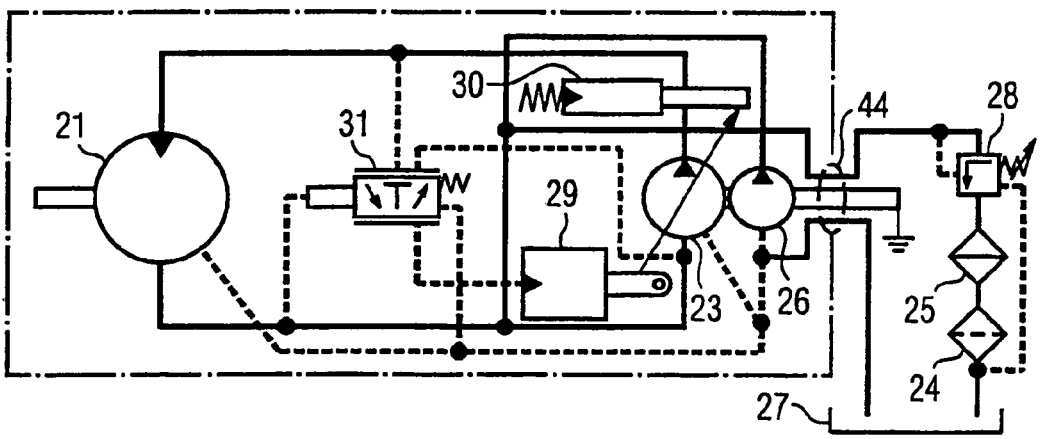

Referring now to FIG. 16 there is illustrated a further example embodiment in which also the charging pump 26 is included in the rotating system of hydraulic motor 21, and feed pump 23 with open/closed loop control of the feed flow.

The invention claimed is:

1. A centrifuge comprising:
   a rotatingly mounted bowl and, concentrically rotatingly mounted therein, a scroll capable of rotating at a differential speed relative to the bowl, a member of the group consisting of the bowl and the scroll being powered by a central exterior (stationary located) motor assembly,
   a hydraulic motor, comprising a motor casing and a motor rotor provided as a gearbox for controllably defining said differential speed, being interposed between the bowl and scroll with the motor casing functionally connected to one of the bowl and the scroll and the motor rotor functionally connected to the other of the bowl and the scroll,
   a hydraulic feed pump for feeding the hydraulic motor, wherein said hydraulic motor is engaged corotatingly with said hydraulic feed pump, and said hydraulic feed pump includes a rotor shaft supported in a non-corotating manner exterior to at least one rotating centrifuge part, and
   adjusting members for changing flow supplied by said feed pump to said hydraulic motor, the adjusting members hydraulically actuatable and arranged to corotate with said hydraulic motor.

2. The centrifuge as set forth in claim 1, wherein the feed pump has a constant displacement volume, wherein said adjusting member is a flow control valve which returns the feed flow not required by said hydraulic motor to a non-pressurized area of a flow circuit connecting the hydraulic motor and the hydraulic pump, said flow control valve setting either the flow branched off from the flow circuit via 2-way flow control or directly regulating the flow delivered to said hydraulic motor via 3-way flow control.

3. The centrifuge as set forth in claim 2, wherein a control aperture of said flow control valve through which said regulated flow flows can be located on both the rotating system and on the non-rotating system.

4. The centrifuge as set forth in claim 2, wherein a control aperture through which said regulated flow flows is controlled by application of return pressure or activated by a proportional magnet or solenoid.

5. The centrifuge as set forth in claim 1, wherein the feed pump has a variable displacement volume, wherein said adjusting member is a hydraulically actuated cylinder which is activated via a servo member.

6. The centrifuge as set forth in claim 5, wherein said servo member is activated directly via a proportional magnet or solenoid.

7. The centrifuge as set forth in claim 5, wherein said servo member is activated directly or indirectly via the charging pressure of a charging pump.

8. The centrifuge as set forth in claim 7, wherein said charging pump like said feed pump is arranged corotating.

9. The centrifuge as set forth in claim 1, further comprising a cooling means and/or a filter means, wherein the cooling means and the filter means are located exterior to said rotating system.

10. The centrifuge as set forth in claim 1, wherein the feed pump has a variable displacement volume, wherein said adjusting member is a hydraulically actuated cylinder which is activated via a valve.

11. The centrifuge as set forth in claim 1, wherein the hydraulic motor casing is functionally connected to the bowl and the motor rotor is functionally connected to the scroll, wherein the hydraulic motor powers the bowl.

* * * * *